United States Patent [19]

Shiratori et al.

[11] Patent Number: 5,294,219
[45] Date of Patent: Mar. 15, 1994

[54] BALL END MILL

[75] Inventors: Hidehisa Shiratori; Tatsuo Arai; Masayuki Okawa, all of Yuuki, Japan

[73] Assignee: Mitsubishi Materials Corporation, Tokyo, Japan

[21] Appl. No.: 995,534

[22] Filed: Dec. 22, 1992

Related U.S. Application Data

[63] Continuation of Ser. No. 778,588, Oct. 17, 1991, abandoned.

[30] Foreign Application Priority Data

Oct. 18, 1990 [JP] Japan ................... 2-280109
Dec. 28, 1990 [JP] Japan ................... 2-409163

[51] Int. Cl.5 ............................... B23C 5/20
[52] U.S. Cl. ............................... 407/34; 407/42; 407/54; 407/116
[58] Field of Search ............. 407/34, 40, 42, 53, 407/54, 116

[56] References Cited

U.S. PATENT DOCUMENTS

| | | | |
|---|---|---|---|
| 3,815,191 | 6/1974 | Holma | 407/116 X |
| 4,132,493 | 1/1979 | Hosoi | 407/53 |
| 4,214,847 | 7/1980 | Kraemer | 407/116 X |
| 4,527,930 | 7/1985 | Harroun | 407/48 X |
| 4,572,714 | 2/1986 | Suzuki et al. | 407/54 X |
| 4,616,963 | 10/1986 | Habert et al. | 407/116 X |
| 4,834,591 | 5/1989 | Tsujimura et al. | 407/113 |
| 4,898,499 | 2/1990 | Tsujimura et al. | 407/42 |
| 5,017,055 | 5/1991 | Tsujimura et al. | 407/113 |

FOREIGN PATENT DOCUMENTS 132910 8/1982 Japan ................... 407/54

Primary Examiner—Steven C. Bishop
Attorney, Agent, or Firm—Cushman, Darby & Cushman

[57] ABSTRACT

There is disclosed a ball end mill which has a hemishepherical portion formed at a front end of an end mill body. A pair of tip mounting seats are formed at the hemishepherical portion. A main throw-away tip and a second throw-away tip are secured on the tip mounting seat respectively such that the axial rake angle of the main tip is set at a negative angle and the axial rake angle of the second tip is set at a positive angle. There is also disclosed a second ball end mill. In the second ball end mill, only a main throw-away tip is secured on a tip mounting seat. The axial rake angle of the main tip is set at a negative angle. One or more chip breaker grooves are formed on a rake face of the tip.

13 Claims, 12 Drawing Sheets

BALL END MILL

This is a continuation of application Ser. No. 07/778,588, filed on Oct. 17, 1991, which was abandoned.

BACKGROUND OF THE INVENTION

The present invention relates to a ball end mill having one or more generally arcuate cutting edges arranged at a forward end of an end mill body. More specifically, the present invention relates to a ball end mill capable of providing sufficient rigidity of the end mill body ensuring the cutting performance of the cutting edges, while controlling the chattering of the end mill body.

A conventional ball end mill having two cutting edges is illustrated in FIGS. 21 and 22. The ball end mill in these figures comprises an end mill body 1 in the form of a circular cylinder. The end mill body 1 has a hemishepherical forward end with which a pair of chip pockets 2 and 3 are formed. A pair of tip mounting seats 4 and 5 are formed at a wall surfaces 2a and 3a of the chip pockets 2 and 3 which face in the cutting (rotational) direction of the end mill body 1. A pair of throw-away tips 6 and 7 (hereinafter referred to as "main tip 6" and "second tip 7") are removably mounted respectively to the tip mounting seats 4 and 5 by respective clamp bolts 15.

The main tip 6 and the second tip 7 are made of cemented carbide and formed in the shape of a plane plate having an uniform thickness. Main cutting edges 10 are formed symmetrically about the center of the main tip 6 at intersections between the rake face 6a and the side faces 6b of the main tip 6.

The main cutting edge 10 consists of an arcuate cutting edge 8 having substantially a ¼ arc and a linear cutting edge 9 rearwardly extending from a rear end of the arc cutting edge 8. Further, the cutting face 6a is shaped in a convex curved surface on the opposite ends of the rake face 6a. A convex curved portion 8a is formed at a edgeline of each convex curved surface. The second tip 7 has substantially the same structural features as the main tip 6. The second tip 7 is formed with a second cutting edges 13 formed at intersections between the rake face 7a and the side faces 7b of the second tip 6 (refer to FIG. 24). The second cutting edge 13 consists of an arcuate cutting edge 11 having substantially a ¼ arc and a linear cutting edge 12 rearwardly extending from a rear end of the arc cutting edge 11. The second tip is distinguished from the main tip 6 by planar sections 14 which are formed on the side face of the second tip 7 adjacent the front end of the arcuate cutting edge 11.

As shown in FIGS. 23 through 25, the main tip 6 and second tip 7 are arranged such that the front end of the main cutting edge 10 of the main tip 6 is located at the rotational center $P_0$ of the end mill when viewed from the front end, and such that the front end of the second cutting edge 13 of the second tip 7 is located at the rear position remote from the rotational center $P_0$, and both tips 6 and 7 are removably mounted respectively to the end mill body 1 by respective clamp bolts 15. Further, the axial rake angles A of the main cutting edge 10 and the second cutting edge 13 are set at a positive angles. According to this construction, when viewed from the front end, the main cutting edge 10 and sub cutting edge 13 are in the shape of a circular arc drawn about the centers $P_1$ and $P_2$ located at the side position of mounting faces 6c and 7c of the tips 6 and 7.

Another example for a conventional end mill, there is known as a single edged ball end mill as illustrated in FIGS. 26 through 29. The ball end mill in these figures has substantially same structural features as the above mentioned ball end mill except for having only a main tip 6. Therefore, the same numerals are put on the same components as the above mentioned ball end mill to avoid repetition of the description.

In such a ball end mill as well, the main tip 6 is arranged such that the front end of the main cutting edge 10 of the main tip 10 is located at the rotational center $P_0$ of the end mill when viewed from front end, and is removably mounted to the end mill body 1 by the clamp bolt 15. Further, the axial rake angle $\gamma_A$ of the main cutting edge 10 is set at a positive angle. According this construction, as shown in FIG. 29, the main cutting edge 10 is in the shape of a circular arc drawn about the center $P_1$ located at the side position of the mounting face 6c when viewed from front end. According to the above mentioned ball end mills, in order to set the axial rake angles $\gamma_A$ at a positive angle, the wall surface of the tip pockets 2 and 3 facing toward the cutting direction and bottom faces of the mounting seats 4 and 5 must be formed such that these faces are inclined counter to the cutting direction of the ball end mill. For this reason, the thickness behind the chip pockets 2 and 3 gradually decrease toward the rear end of the end mill. As a result, the rigidity of the end mill body 1 decreases, so the chattering of the end mill body occurs often. This sometimes causes the ball end mill to break at the side of the main cutting edge 10 which bears a high cutting load.

In order to solve the above drawback, it may be suggested to set both axial rake angles $\gamma_A$ of the main cutting edge 10 and sub cutting edge 13 at negative angles so as to increase the thickness of the portion behind the chip pockets 2 and 3. However, in such a ball end mill, the cutting performance of the end mill decreases since the cutting resistance affects to the main cutting edge 10 and second cutting edge 13 increase. This results in various drawbacks such as increase of consumption of electric power and frequency of breakage of cutting edge.

SUMMARY OF THE INVENTION

It is an object of the invention to provide a ball end mill capable of providing sufficient rigidity of the end mill body ensuring the cutting performance of the cutting edges, while controlling chattering of the end mill body.

According to the invention, there is provided a first ball end mill comprising a tool body rotatable about an axis. The tool body consists of a plurality of rake faces at the front end thereof. The rake faces have a main cutting edge and a second cutting edge respectively at radially outward edgelines thereof. The axial rake angle of the main cutting edge is set at a negative angle. The main cutting edge has a forward portion and a rearward portion. At least the forward portion is substantially arcuately shaped when viewed from the rotational direction of the tool body and extends in the forward direction so as to intersect with the axis. The second cutting edge has a positive axial rake angle and a forward end, and is disposed circumferentially remote from the main cutting edge. The forward end is disposed radially outwardly remote from the axis.

The rake face is preferably formed with one or more chip breaker grooves extending along the main cutting edge. The width and the depth of the chip breaker grooves gradually increase toward the rear end of the cutting edge.

In the ball end mill according to the invention, because the axial rake angle of the main cutting edge which bears large cutting resistance is set at a negative angle, the chip pocket for the main cutting edge inclines in the cutting direction of the end mill body. By this construction, the thickness of the portion behind the chip pocket for the main tip, which requires a high rigidity, gradually increases toward the rear end of the end mill body and the rigidity of the end mill body increases as well. Of course this results in somewhat increase in the cutting resistance of the main cutting edge. However, such a disadvantage is not worth serious consideration since the chattering of the end mill body can be sufficiently controlled by the increased rigidity.

On the other hand, since the axial rake angle of the second cutting edge is set at a positive angle as in the conventional ball end mill, the cutting resistance is small and the cutting performance of the ball end mill is maintained. Further, since the cutting load affects the second cutting edge far less in comparison with the main cutting edge, the tool rigidity is sufficient even though the axial rake angle of the second cutting edge is positively set.

Moreover, since the axial rake angle of the main cutting edge is negatively set, when viewed from front end of the ball end mill, the rearward portion of the cutting edge projects further toward the cutting direction than the forward portion of the cutting edge. As a result, during cutting operation, the main cutting edge gradually engages with a workpiece from the rearward portion to the forward portion. On the contrary, since the axial rake angle of the second cutting edge is set positively, the forward portion of the cutting edge projects further toward the cutting direction than the rearward portion of the cutting edge. As a result, in a cutting operation, the second cutting edge gradually engages with the workpiece from the forward portion to the rearward portion. For these reason, the vibrations transmitted from the main cutting edge and from the second cutting edge counteract each other, so that the chattering is prevented more effectively.

Furthermore, according to the invention, there is provided a second ball end mill comprising only a main cutting edge. The ball end mill comprises a tool body rotatable about an axis. The tool body comprises a rake face having a main cutting edge at a radially outward edgeline thereof. The axial rake angle of the main cutting edge is set at a negative angle. The main cutting edge has a forward portion and rearward portion. At least the forward portion is substantially arcuately shaped, when viewed from the rotational direction of the tool body, and extends in the forward direction so as to intersect with the axis. One or more tip breaker grooves extending along the main cutting edge are formed on the rake face.

The width and the depth of the chip breaker grooves are decided in accordance with the type of workpieces and the condition of a cutting operation, preferably, the width and the depth of the chip breaker grooves are gradually increased toward the rear end of the cutting edge.

In the second ball end mill according to the invention, since the axial rake angle of the main cutting edge is set at a negative angle, the thickness of the portion behind the chip pocket increase toward the rear end of the end mill body, so that the tool rigidity of the end mill body is sufficiently ensured.

Further, one or more chip breaker grooves extending along the main cutting edge are formed on the rake face; the axial rake angle when viewed in a section perpendicular to the main cutting edge is a substantially positive angle, so that the cutting performance is increased.

In addition, regarding the thickness of chips produced by the main cutting edge during a cutting operation, the rearward portion of the chips are thicker than the forward portion thereof. Therefore, by designing the width and the depth of the chip breaker grooves in relation to the thickness of the chips, the groove can be formed in a small but sufficient size, improving the cutting performance and chip discharging performance while minimizing the loss of rigidity. Such advantages can be obtained by the first ball end mill having the chip breaker grooves.

DETAILED DESCRIPTION

Referring to FIGS. 1 through 5, there is shown an embodiment of the first ball end mill according to the invention. The ball end mill according to the embodiment has an axial rake angle set at a main cutting edge. Before the detailed description of the characteristic features, the general features of the ball end mill is described. In the following description of the ball end mill, the same numerals are put on the same components as the above mentioned conventional ball end mill to avoid repetition of the description.

Figure 2:
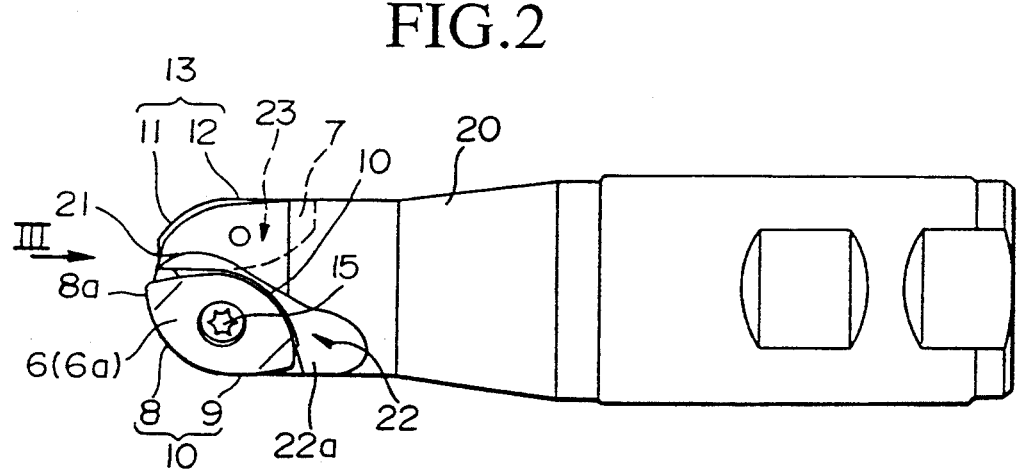
FIG. 2 is a plan view of a ball end mill when viewed in the direction perpendicular to the main cutting edge.
Figure 3:
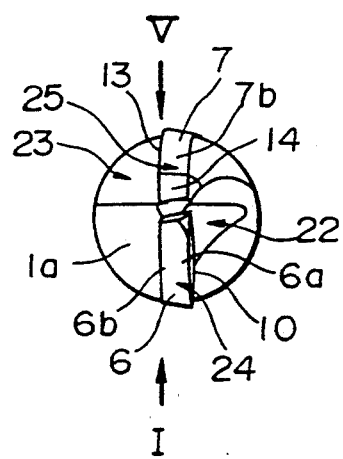
FIG. 3 is a view as viewed from the arrow III in FIG. 2.

Referring to FIGS. 2 and 3, numeral 20 shows end mill body. The end mill body 20 is formed with a hemispherical portion 21 at a front end thereof. The hemispherical portion is formed with a pair of chip pockets 22 and 23 which are formed by removing substantially a ¼ arc outward wall portion of the hemispherical portion 21. A tip mounting seat 24 is formed at a wall surface of the tip pocket 22 facing toward the cutting direction of the end mill body 20. A tip mounting seat 25 is formed at a wall surface of the tip pocket 23 facing toward the cutting direction of the end mill body 20. A main tip 6 and a second tip 7 are removably mounted respectively to the tip mounting seats 24 and 25 by respective clamp bolts 15.

Figure 4:
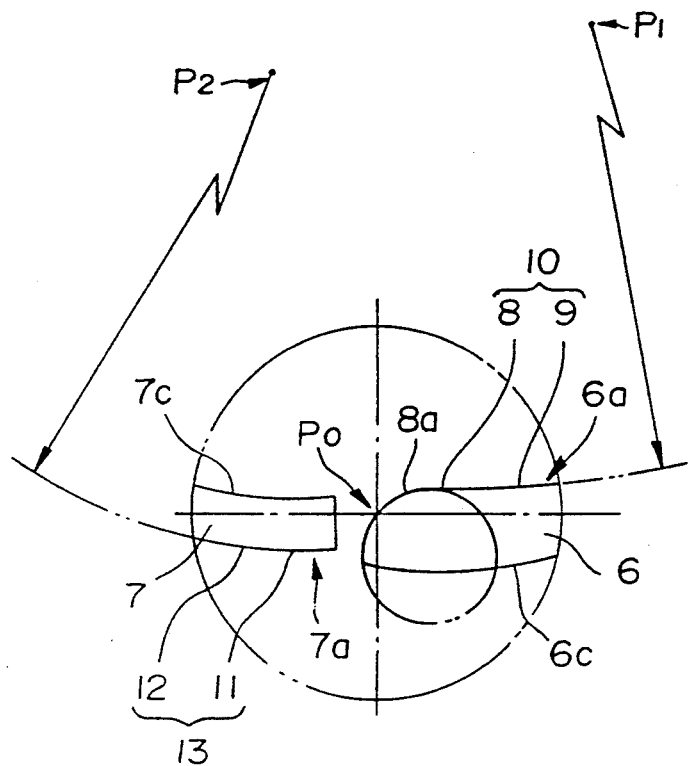
FIG. 4 is an enlarged end view of the end mill.

As shown in FIGS. 3 and 4, the main tip is arranged such that the front end of the main cutting edge 10 of the main tip 6 is located at the rotational center $P_0$ of the end mill when viewed from front end of the end mill body 20. The second tip 7 is arranged such that the front end of the second cutting edge 13 of the second tip 7 is radially remote from the rotational center $P_0$.

Figure 1:
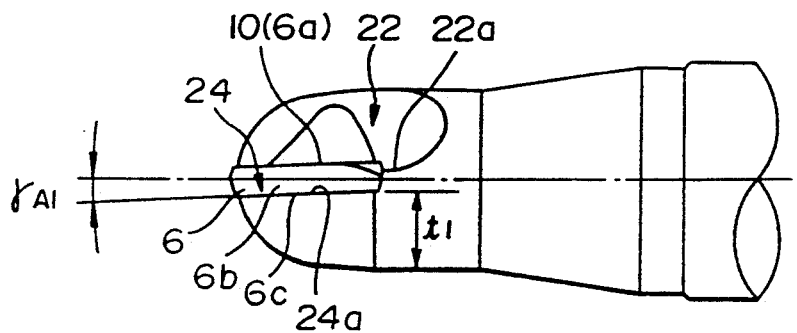
FIG. 1 is a side view of a ball end mill when viewed from side of a main cutting edge according to the first embodiment of the invention.
Figure 25:
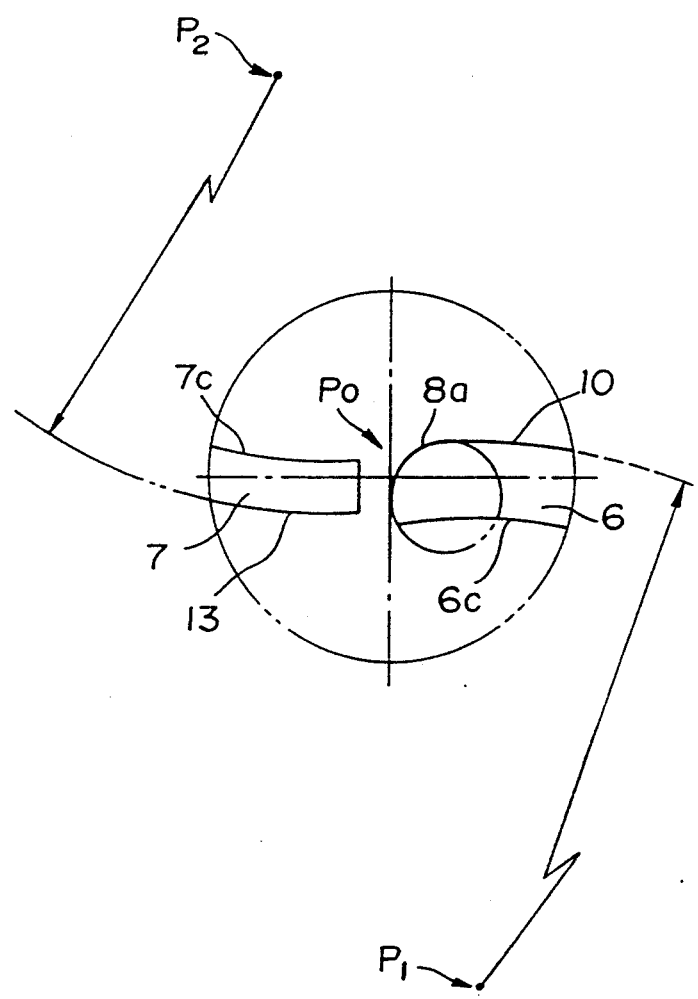
FIG. 25 is an enlarged end view of a conventional end mill.
Figure 26:
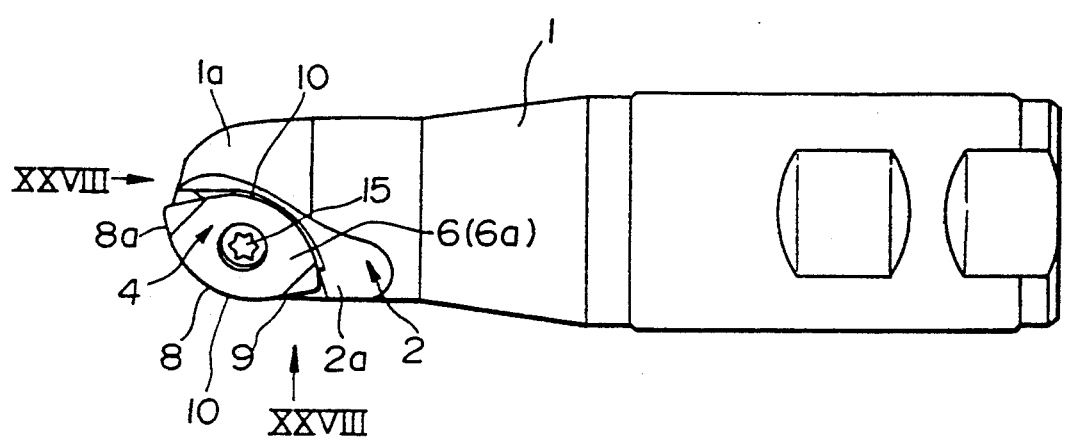
FIG. 26 is a plan view of another conventional ball end mill.
Figure 27:
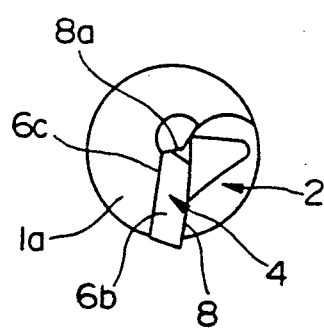
FIG. 27 is a view as viewed from the arrow XVII in FIG. 26.
Figure 28:
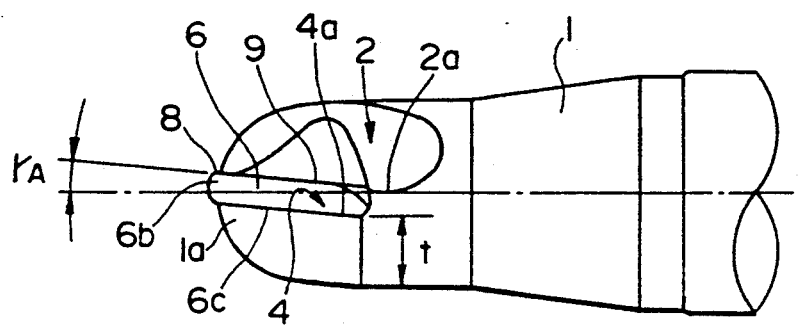
FIG. 28 is a view as viewed from the arrow XVIII in FIG. 26.
Figure 29:
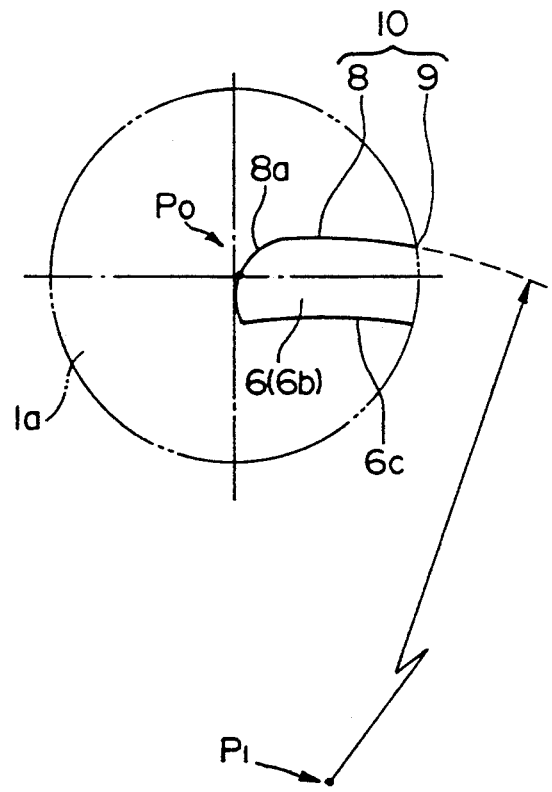
FIG. 29 is an enlarged end view of a conventional end mill.

As shown in FIG. 1, the bottom face 24a of the tip mounting seat 24 is inclined toward the cutting direction of the end mill, so that the axial rake angle $\gamma_{A1}$ of the main cutting edge 10 is rendered a negative angle. According this construction, when viewed from the front end of the end mill body 20 as shown in FIG. 4, the convex curved portion 8a of the main cutting edge 10 is in the shape of a convex curve projecting toward the cutting direction. On the other hand, the radially extending potion from the convex curved portion 8a is in the shape of a concave curve projecting counter to the cutting direction, and the center $P_1$ of the concave curve, i.e., the circular arc is located at the side position of the rake face 6a of the tip 6 (FIG. 4). By this construction, the rear end of the linear cutting edge 9 is located at the position most projected in the cutting direction, and the shape of the main cutting edge 10 is significantly different from the shape of the main cutting edge in the conventional ball end mill as shown in FIG. 25. That is, the main cutting edge 10 of the conventional ball end mill is in the shape of a convex curve projecting toward the cutting direction, and the center $P_1$ of the convex curve is located at the side position of the mounting face 8c of the tip 6.

Figure 5:
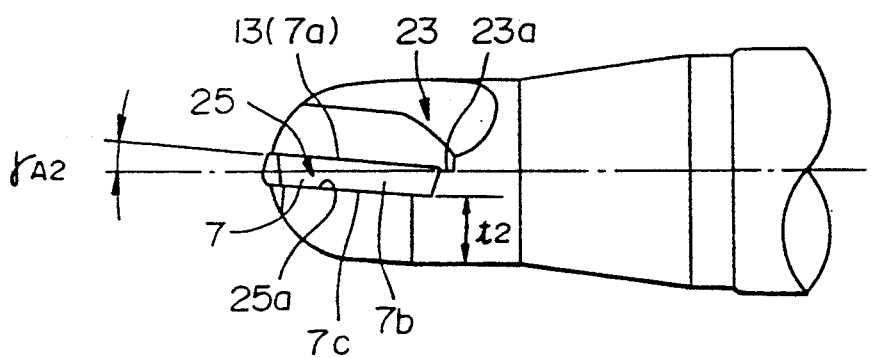
FIG. 5 is a view as viewed from the arrow V in FIG. 3.

On the other hand, as shown in FIG. 5, the bottom face 25a of the tip mounting seat 25 for the second tip 7 is inclined counter to the cutting direction, so that the axial rake angle $\gamma_{A2}$ of the second cutting edge 13 is rendered a positive angle as in the conventional ball end mill. By this construction, when viewed from the front end, the second cutting edge 13 is substantially in the shape of a convex curve, i.e., a circular arc drawn about the center $P_2$ located at the side position of the mounting face 7c of the second tip 7 as in the conventional ball end mill.

The axial rake angle $\gamma_{A1}$ and $\gamma_{A2}$ of the main cutting edge 10 and the second cutting edge 13 are determined upon considering the type of workpieces and the cutting condition, preferably, the axial rake angle $\gamma_{A1}$ of the main cutting edge 10 is set at a range of $-5°$ through $-1°$, the axial rake angle $\gamma_{A2}$ of the second cutting edge 13 is set at a range of $1°$ through $10°$. If the axial rake angle $\gamma_{A1}$ is more than $-1°$ and the axial rake angle $\gamma_{A2}$ of the second cutting edge 13 is less than $1°$, the advantages of the invention based on the axial rake angles $\gamma_{A1}$ set at a negative angle and $\gamma_{A2}$ set at a positive angle may not be obtained sufficiently. If the axial rake angle $\gamma_{A1}$ of the main cutting edge 10 is less than $-5°$, the cutting performance of the main cutting edge 10 may be significantly reduced since the cutting resistance effects on the main cutting edge 10 increase. Further, if the axial rake angle $\gamma_{A2}$ of the second cutting edge 13 is more than $10°$, the rigidity of the end mill body 20 will be reduced since the thickness $t_2$ of the portion behind the tip pocket 23 for the second cutting edge 13 decreases excessively. In this connection, in the embodiment as shown in figures, the axial rake angle $\gamma_{A1}$ of the main cutting edge 10 is set at $-2°$, and the axial rake angle $\gamma_{A2}$ of the second cutting edge 13 is set at $5°$ for a tool diameter of 25 mm.

In the ball end mill arranged as described above, since the axial rake angle $\gamma_{A1}$ is set at a negative angle, the wall surface of the tip pocket 22 for the main cutting edge 10 facing toward the cutting direction inclines in the cutting direction of the end mill body. Accordingly, the thickness $t_1$ of the portion behind the chip pocket 22 become sufficiently large in comparison with the conventional ball end mill. As a result, the rigidity of the end mill body increases, so that the chattering and the breakage of the end mill body can be effectively prevented. Of course, it may be concerned that the cutting resistance effects on the main cutting edge 10 increase since the axial rake angle $\gamma_{A1}$ is set at a negative angle, so that the chattering tend to occur. In practice, since the rigidity of the end mill body 20 is sufficiently increased, the chattering of the end mill body 20 can be sufficiently controlled by the increase of rigidity.

On the other hand, since the axial rake angle $\gamma_{A2}$ of the second cutting edge 13 is set at positive angle as in the conventional end mill, the cutting performance of the whole cutting edges 10 and 13 is excellent, more than in the case in which the axial rake angle $\gamma_{A2}$ of the second cutting edge 13 is set at negative angle. Further, although the thickness $t_2$ of the portion behind the chip pocket 23 for the second cutting edge 13 gradually decreases toward the rear end of the ball end mill, the decrease of the rigidity of end mill body 20 can be ignored since the cutting resistance effects on the second cutting edge 13 is far less in comparison with the main cutting edge 10, so that the rigidity of the end mill body 20 is sufficient.

In addition, during a cutting operation by the main cutting edge 10, since the rearward portion of the linear cutting edge projects toward cutting direction over the arcuate cutting edge 8, the main cutting edge 10 is gradually engaged with a workpiece (not shown) toward the arcuate cutting edge 8 from the rearward portion of the linear cutting edge 9. On the contrary, during a cutting operation by the second cutting edge 13, since the forward end of the arcuate cutting edge 12 projects toward the cutting direction over the linear cutting edge 12, the second cutting edge 13 is gradually engaged with a workpiece toward the linear cutting edge 12 from the forward end of the arcuate cutting edge 11. As a result, the vibration transmitted from the main cutting edge 10 and the second cutting edge 13 counteract each other, so that the chattering is effectively prevented. In this connection, both the main cutting edge 10 and the second cutting edge 13 of the conventional ball end mill are engaged with a workpiece toward the linear cutting edges 9 and 12 from the arcuate cutting edges 8 and 11, so that the directions of the vibration tend to coincide with each other, which results in the large chattering.

Figure 6:
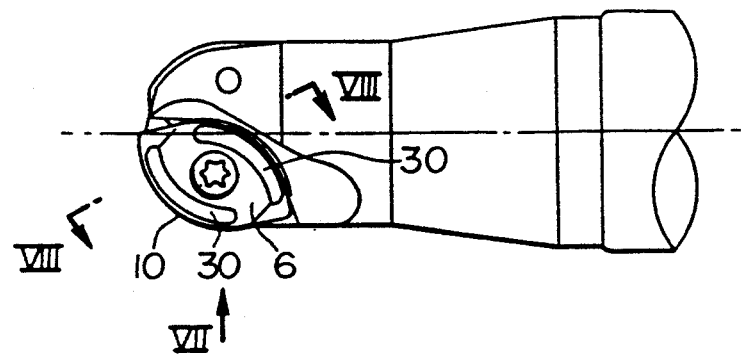
FIG. 6 is a plan view of a ball end mill according to the second embodiment of the invention when viewed in the direction perpendicular to the main cutting edge.
Figure 7:
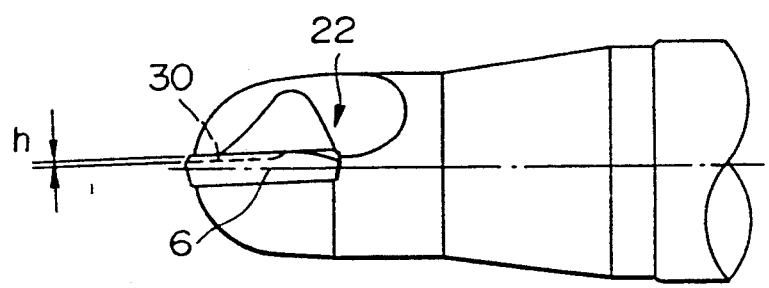
FIG. 7 s a view as viewed from the arrow VII in FIG. 6.
Figure 8:
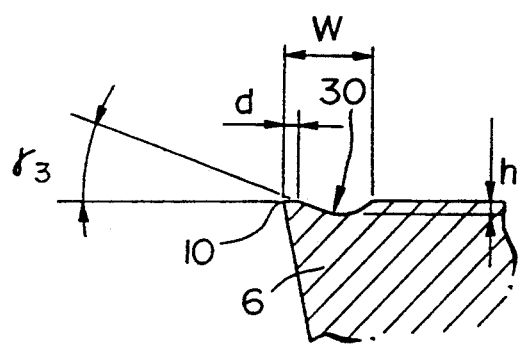
FIG. 8 is a cross sectional view taken along the line VIII—VIII in FIG. 6.
Figure 9:
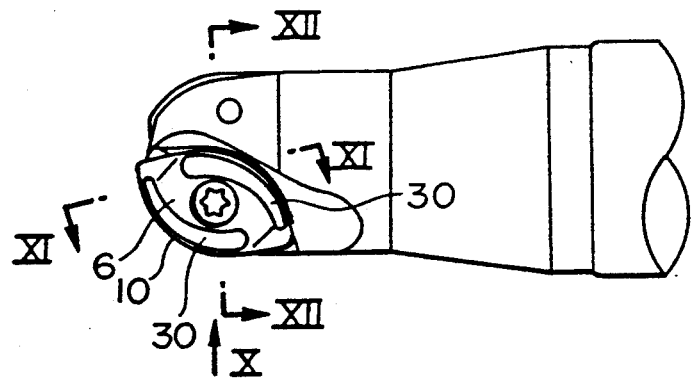
FIG. 9 is a plan view of a ball end mill according to the third embodiment of the invention when viewed in the direction perpendicular to the main cutting edge.
Figure 10:
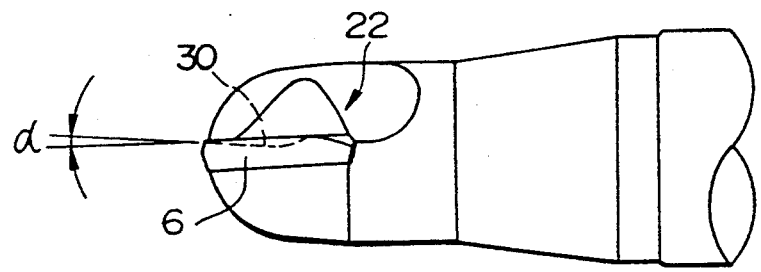
FIG. 10 is a view as viewed from the arrow X in FIG. 9.
Figure 11:
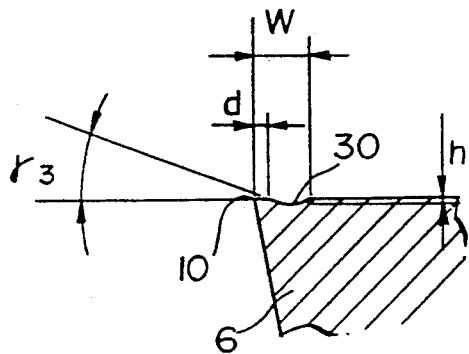
FIG. 11 is a cross sectional view taken along the line XI—XI in FIG. 9.
Figure 12:
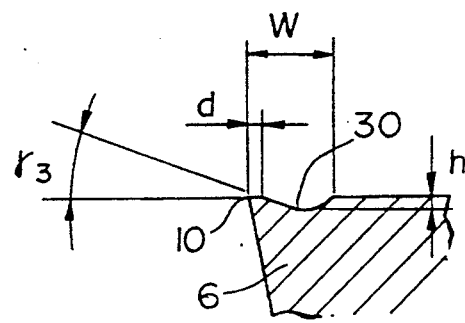
FIG. 12 is a cross sectional view taken along the line XII—XII in FIG. 9.

FIGS. 6 through 8 show a further modified ball end mill in accordance with the above embodiment which comprises tips 6 and 7 having the rake faces 6a and 7a. In this modified ball end mill, the rake face 6a of the main cutting edge 6 is formed with chip breaker groove 30 extending along the main cutting edge 10, having the width W and leaving a small space (hereinafter referred to as "land") with the main cutting edge 10. By this chip breaker groove 30, since the axial rake angle when viewed in a section perpendicular to the main cutting edge 10 (hereinafter referred to a "tip rake angle") is rendered substantially positive, the cutting performance of the main cutting edge 10 is increased and a smooth discharge of chips is ensured, so that the cutting resistance can be reduced more efficiently. The width d of the land is properly determined upon considering the diameter of a ball end mill or the like, preferably set at a range of 0.01 mm through 0.5 mm.

In the ball end mill having the arcuate main cutting edge 10 such as the above modification, regarding the cutting volume by the main cutting edge 10, the cutting volume by the rearward portion of the main cutting edge 10 is larger than the cutting volume by the forward portion of the main cutting edge 10, so that the rearward portion of chips produced by the main cutting edge 10 are thicker than the forward portion of the chips. Therefore, if the width W and the depth h of the chip breaker grooves 30 are designed as constant, the width W and the depth h must be determined so as to adapt to the thickness of the most rearward portion thereof. For this reason, the cross section of the forward portion of the chip breaker groove 30 must be unnecessarily large in comparison with the volume of the chips, so that the rigidity of the end mill body 20 is reduced.

In accordance with the modification of the ball end mill as shown in FIGS. 9 through 12, the width W of the chip breaker groove 30 gradually increases toward the rearward end of the main cutting edge 30 from forward end thereof, and/or the bottom face of the chip breaker groove 30 is inclined in the angle $\alpha$ with respect to the rake face 6a, so that the depth h of the chip breaker groove 30 gradually increases toward the rear end of the main cutting edge 10 from the front end thereof. For this construction, the chip breaker groove 30 has its cross section adapted to the thickness of the chips over the length of the chip breaker groove 30, and the cutting performance by the main cutting edge 10 is increased and a smooth discharge of chips is ensured, maintaining the rigidity of the end mill body 20.

In the above embodiment, although the invention is applied to a double edged ball end mill, the invention can be applied to other type of ball end mill, for example a ball end mill having two or more second cutting edges. Furthermore, the invention can be applied to a ball end mill having tips soldered to a forward portion of an end mill body and to a solid type ball end mill having cutting edges formed on an end mill body. It is obvious that these ball end mills can obtain the same advantages as the above embodiment, which can increase the portion behind the chip pocket and ensure the rigidity of end mill body.

The advantages of the invention were verified by way of the following cutting test, which was performed by using a ball end mill shown in FIGS. 9 through 12. The cutting resistance, i.e. the cutting performance, was judged by measuring the consumption of electric power, the chip discharge performance by observation of the chips, the degree of the chattering and the rigidity of the end mill body by observation of the cutting noise. The results are shown in the Table. Further, for a comparable example, conventional ball end mill having a main and a second cutting edges whose axial rake angles are set at positive angle, was tested, and the results are shown in the Table. The cutting tests were conducted under the following conditions:

(1) Cutting Condition

Workpiece: Steel (JIS SCM440; Hardness:HB100)
Cutting speed: 120 m/minute
Cutting depth: 10 mm
Cutting width: 3 mm or 6 mm
Horizontal feed rate of a cutting table:
400 mm/minute at cutting width of 3 mm
600 mm/minute at cutting width of 6 mm
Feed rate per a cutting edge:
0.13 mm/revolution at cutting width of 3 mm
0.20 mm/revolution at cutting width of 6 mm (2) Dimensions of the end mills 1. Invention
Diameter of the ball end mill: 32 mm
Axial rake angle $\gamma_{A1}$ of the main cutting edge: $-2°$
Axial rake angle $\gamma_{A2}$ of the second cutting edge: $5°$
Width of the land d: 0.1 mm
Tip rake angle $\gamma_3$: $15°$
2. Conventional Ball End Mill
Axial rake angle $\gamma$ of the main and second cutting edge: $5°$
Other dimensions: the same as the invention

TABLE

| Cutting width | Cutting power | Cutting noise | Chip discharge performances | Cutting resistance | Rigidity |
| --- | --- | --- | --- | --- | --- |
| INVENTION | | | | | |
| 3 mm | 1.5 KW | ○ | ○ | ○ | ○ |
| 6 mm | 2.5 KW | ○ | ○ | ○ | ○ |
| CONVENTIONAL BALL END MILL | | | | | |
| 3 mm | 1.7 KW | △ | △ | ○ | △ |

TABLE-continued

| Cutting width | Cutting power | Cutting noise | Chip discharge performances | Cutting resistance | Rigidity |
|---|---|---|---|---|---|
| 6 mm | 2.7 KW | Δ | Δ | ○ | Δ |

○: Good
Δ: Approved

As will be seen from the Table, the results by the ball end mill according to the invention indicate the same cutting performance as the conventional ball end mill and it is obvious that the rigidity of the end mill body exceed the conventional ball end mill. Further, the cutting noise was lower than the conventional ball end mill, and the chip discharge performance was better than the conventional ball end mill. These results indicate the superiority of the invention over the conventional ball end mill.

As mentioned above, since the first ball end mill according to the invention is arranged such that only the axial rake angle of the main cutting edge which bears high cutting load is set negatively, the thickness of the portion behind the chip pocket for the main tip is increased. By this construction, the rigidity of the end mill body increases, so that the rigidity of the end mill body is ensured and the chattering or the breakage of the end mill body is prevented, and the cutting performance is improved.

Furthermore, since the main cutting edge gradually engages with a workpiece from rearward portion to the forward portion, and the second cutting edge gradually engages with a workpiece from the forward portion to the rearward portion during cutting operation, the vibration transmitted from the main cutting edge and the second cutting edge counteract each other, so that the chattering is prevented more effectively and the cutting accuracy is improved.

In addition, by forming the chip breaker grooves on the rake face of the main tip, the chip discharge performance and cutting performance are far improved. Further, by changing the width and the depth of the chip breaker groove from the front end to the rear end of the end mill body, the cross section of the chip breaker groove can be small but sufficient, so that the rigidity of the end mill body can be ensured, increasing the cutting performance and chip discharge performance.

Figure 13:
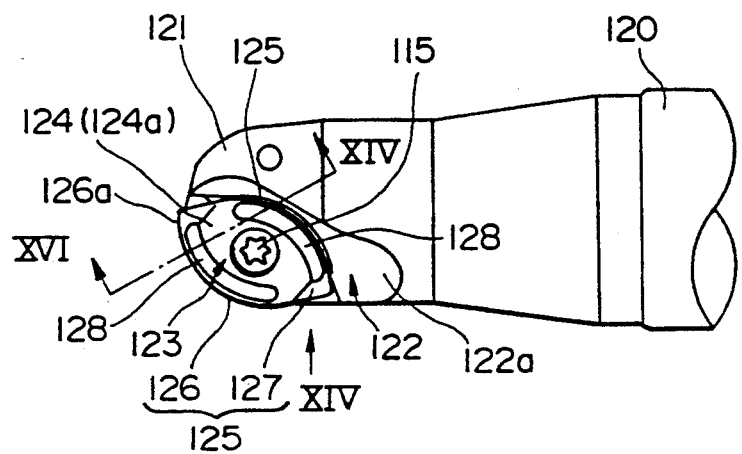
FIG. 13 is a side view of a ball end mill when viewed from side of a main cutting edge according to the fourth embodiment of the invention.
Figure 14:
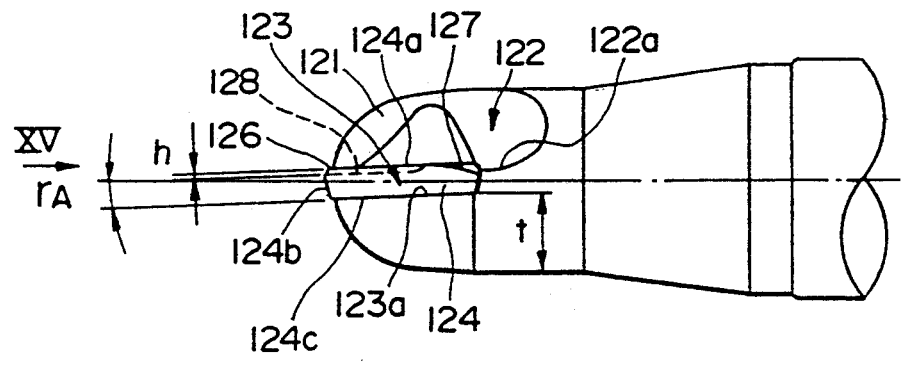
FIG. 14 is a view as viewed from the arrow XIV in FIG. 13.

FIGS. 13 through 20 show an embodiment of the second ball end mill according to the invention. Referring to FIGS. 13 and 14, numeral 120 shows an end mill body. The end mill body 120 is formed with a hemishepherical portion 121 at a front end of the end mill body 120. The hemishepherical portion 121 is formed with a pair of tip pockets 122 and 123 which are formed by removing over substantially a ¼ arc of the outer wall portion of the hemishepherical portion 121. A tip mounting seats 123 is formed at a wall surface of the tip pocket 122 which faces in the cutting direction of the end mill body 120. A main tip 124 is removably mounted to the tip mounting seat 123 by a clamp bolt 115.

The main tip 124 has the same constructive features as the main tip 6. That is, the main tip 124 has a rake face 124a, a side face 124b, a mounting face 124c, a main cutting edge 125 consisting of an arcuate cutting edge 126 and a linear cutting edge 127, and a convex curved portion 126a formed at the front end of the arcuate cutting edge 126. The tip 124 is arranged such that the front end of the main cutting edge 125 of the main tip 124 is located at the rotational center $P_0$ of the ball end mill when viewed from front end, and secured to the end mill body 120.

As shown in FIG. 14, the bottom face 123a of the tip mounting seat 123 is inclined in the cutting direction of the ball end mill, so that the axial rake angles $\gamma_A$ of the main cutting edge 10 is set at negative angles.

Figure 15:
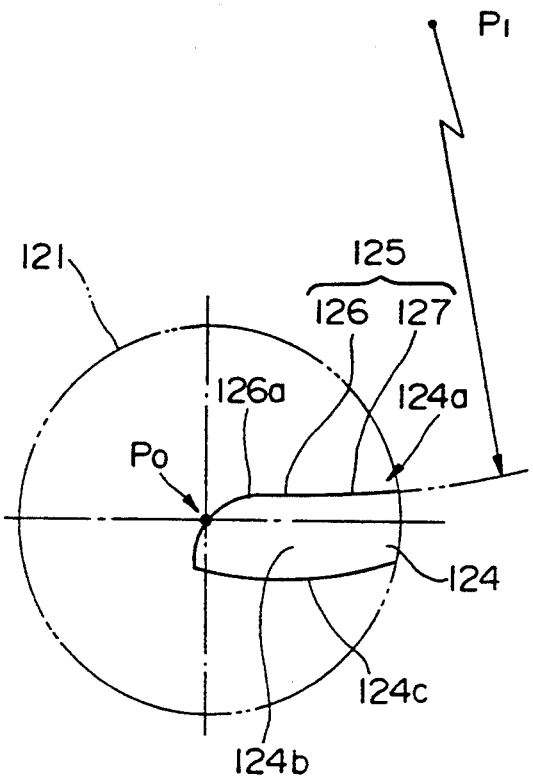
FIG. 15 is a view as viewed from the arrow XV in FIG. 13.
Figure 16:
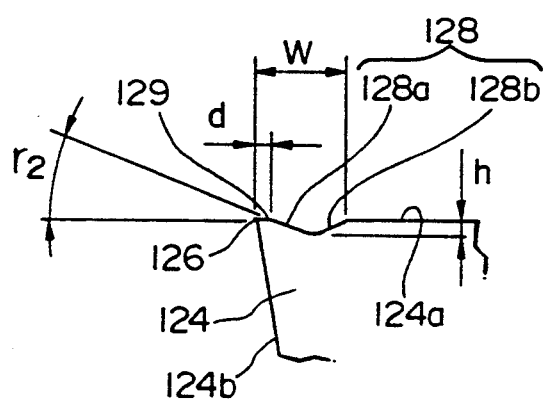
FIG. 16 is a cross sectional view taken along the line XVI—XVI in FIG. 13.
Figure 17:
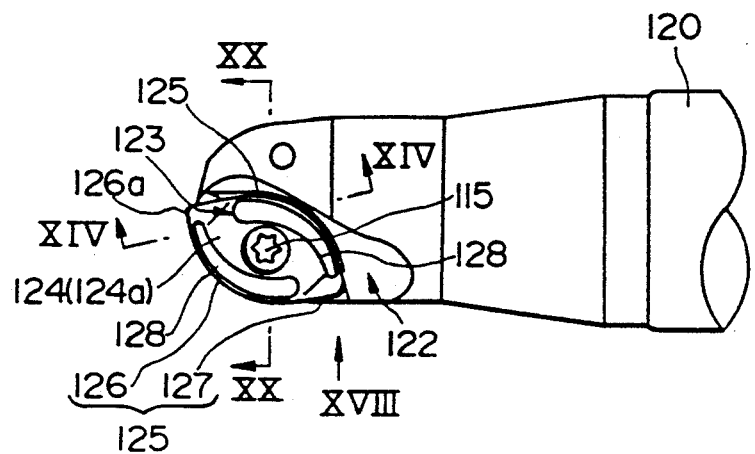
FIG. 17 is a plan view of a ball end mill according to the fifth embodiment of the invention when viewed in the direction perpendicular to the main cutting edge.
Figure 18:
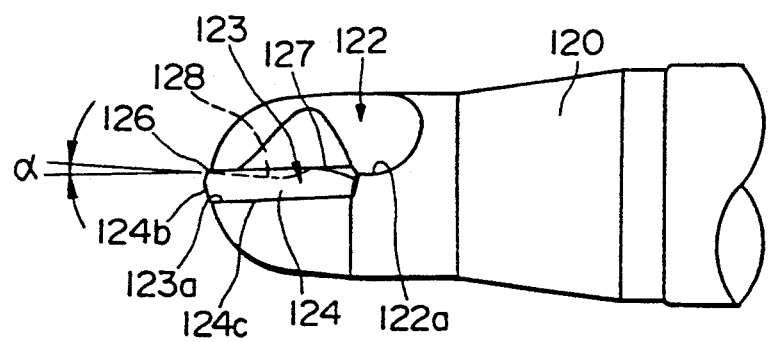
FIG. 18 is a view as viewed from the arrow XVIII in FIG. 17.
Figure 19:
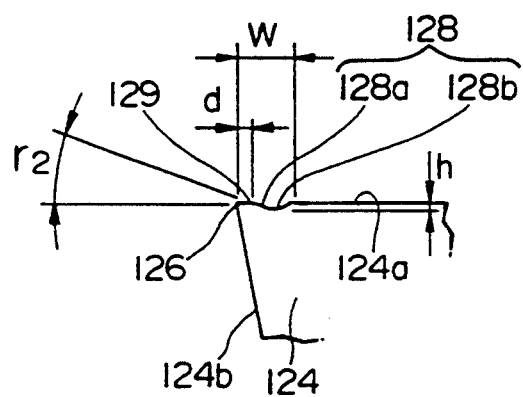
FIG. 19 is a cross sectional view taken along the line XIV—XIV in FIG. 17.
Figure 20:
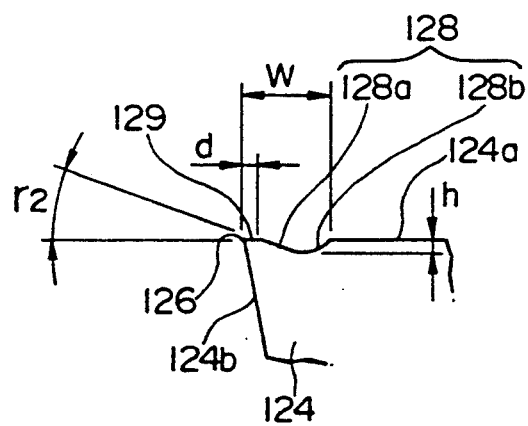
FIG. 20 is a cross sectional view taken along the line XX—XX in FIG. 17.
Figure 21:
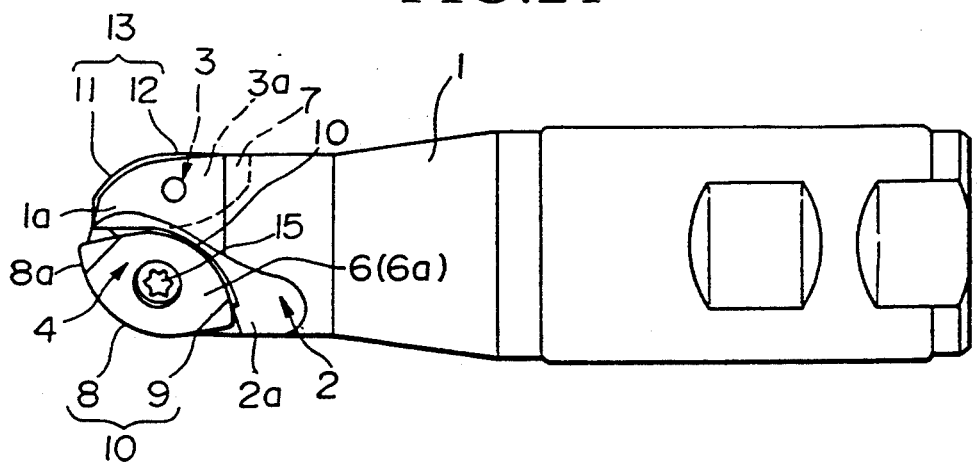
FIG. 21 is a plan view of a conventional ball end mill.
Figure 22:
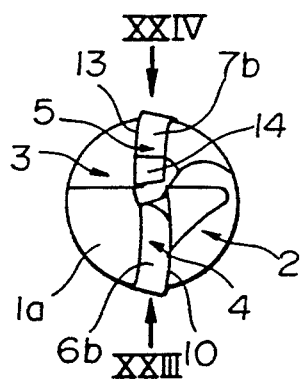
FIG. 22 is an end view of a conventional end mill.
Figure 23:
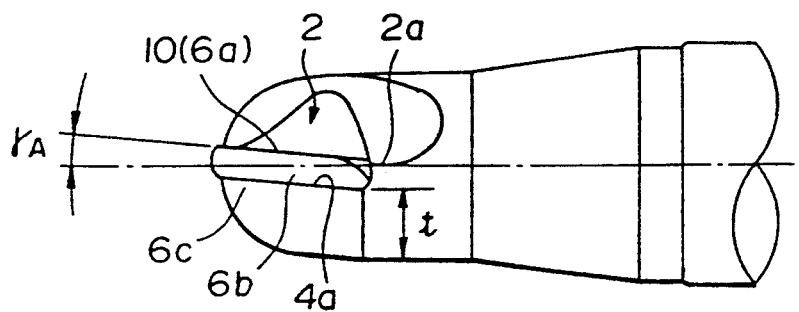
FIG. 23 is a view as viewed from the arrow XXIII in FIG. 22.
Figure 24:
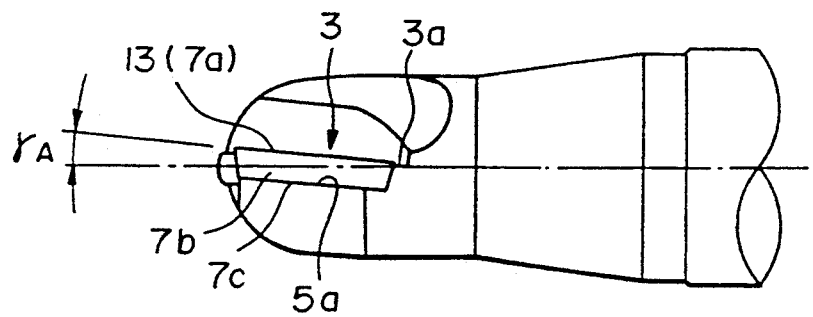
FIG. 24 is a view as viewed from the arrow XXIV in FIG. 22.

According to this construction, when viewed from front end of the end mill body 120 as shown in FIG. 15, the convex curved portion 126a of the main cutting edge 125 is in the shape of a substantially convex curve projecting toward the cutting direction. On the other hand the radially extending portion from the convex curved portion 126a is in the shape of a concave curve projecting counter to the cutting direction, and the center $P_1$ of the concave curve, i.e., the circular arc is located at the side position of the rake face 124a of the tip 124. By this construction, the rear end of the linear cutting edge 127 is located at the position most projected in the cutting direction.

The axial rake angle $\gamma_{A1}$ of the main cutting edge 125 is determined in accordance with the type of materials to be processed and the condition of a cutting operation, preferably, the axial rake angle $\gamma_{A1}$ of the main cutting edge 125 is set at a range of $-5°$ through $-1°$ as well. In this connection, in the embodiment as shown in Figs, the axial rake angle $\gamma_{A1}$ of the main cutting edge 10 is set at $-2°$ for tool diameter of 25 mm.

As shown in FIG. 13, the rake face 124a of the main tip 124 is formed with chip breaker grooves 128. As detailed in FIG. 16, the chip breaker groove 128 is defined by an inclined faces 128a and breaker face 128b. The inclined face 128a extends along the arcuate cutting edge 126 and leaves a land 129 having a small width d. The opposite ends of the inclined face 128a are shaped in concave curved faces extending the rake face 124a. The chip breaker grooves 128 have a constant width W over its length. The width W indicates the distance between the main cutting edge 126 and the ridgeline which is an intersection between the breaker face 128b and the rake face 124a when viewed in a section perpendicular to the main cutting edge 126.

The inclined face 128a is proportionally deepened toward the center of the tip 124 from the land 129, so that the tip rake angle $\gamma_2$ of the tip 124 when viewed in a section perpendicular to the arcuate cutting edge 126 is constant positive angle over the whole length of the chip breaker groove 128. Further, the depth h of the breaker face 128b is constant over the whole length of the tip breaker groove 128.

Thus, in the ball end mill arranged as described above, since the axial rake angle $\gamma_{A1}$ is set at negative angle, the wall surface 122a of the chip pocket 122 facing toward the cutting direction and the bottom face 123a of the tip mounting seat 123 incline in the cutting direction of the end mill body. Accordingly, the thickness t of the portion behind the chip pocket 122 is sufficiently large in comparison with the conventional ball end mill. As a result, the rigidity of the end mill body 120 increases, so the chattering and breaking of the end mill body 120 can be effectively prevented.

Further, because of the existence of the inclined face 128a of the chip breaker groove 128, although the axial rake angle $\gamma_A$ is set at negative angle, the cutting performance of the main cutting edge 125, especially the arcuate cutting edge 126 is increased just as if the axial rake angle $\gamma_A$ is set at a positive angle. In addition, since the chips are curled in a small size, the chip discharge performance is increased and the cutting resistance is reduced. In this connection, the width W of land 129 is properly determined upon considering the diameter of a ball end mill or the like, preferably set at a range of 0.01 mm through 0.5 mm.

FIGS. 17 through 20 show a further modified ball end mill in accordance with the above embodiment. In this modified ball end mill, the width W of the chip breaker groove 128 gradually increases toward the rear end of the main cutting edge 125 from the front end thereof, and/or the breaker face 128b of the chip breaker groove 128 is inclined in the angle α with respect to the rake face 124a, so that the depth h of the chip breaker groove 128 gradually increase toward the rear end of the main cutting edge 10 from the front end thereof. By this construction, the chip breaker groove 30 has its cross section adapted to the thickness of the chips over the length of the chip breaker groove 128, and the cutting performance of the main cutting edge 125 is increased and a smooth discharge of chips is ensured, maintaining the rigidity of the end mill body 120.

As mentioned above, the second ball end mill according to the invention is arranged such that the axial rake angle is set at a negative angle and the tip breaker groove extending along the main cutting edge is formed on the rake face. By this construction, the rigidity of the end mill body is ensured since the thickness behind the chip pocket is increased, which prevents the chattering or the breakage of the end mill body. Furthermore, the cutting performance and the chip discharge performance is ensured.

What is claimed is:

1. A ball end mill comprising:
   a tool body rotatable about an axis,
   said tool body having a plurality of tip mounting seats,
   a first throw-away tip and a second throw-away tip being removably mounted in said tip mounting seats,
   said first throw-away tip having a front face and a rear face being parallel to each other,
   one of said front face and said rear face being employed as a cutting face having a main cutting edge disposed at radially outward edge lines thereof,
   said second throw-away tip having a front face and a rear face parallel to each other,
   one of said front face and said rear face of said second tip being employed as a cutting face having a second cutting edge disposed at radially outward edge lines thereof,
   the axial rake angle of said main cutting edge being set at a negative angle,
   said main cutting edge having a forward portion and a rearward portion, at least the forward portion being substantially arcuately shaped when viewed from the rotational direction of said tool body and extending so as to intersect with said axis,
   said second cutting edge having a positive axial rake angle and a forward end, and being disposed circumferentially remote from said main cutting edge, the forward end being disposed radially outwardly remote from said axis.

2. A ball end mill according to claim 1, wherein at least one chip breaker groove extending along said main cutting edge is formed on said first throw-away tip.

3. A ball end mill according to claim 2, wherein the width of said at least one chip breaker groove gradually increases toward a rear end thereof.

4. A ball end mill according to claim 3, wherein the depth of said at least one chip breaker groove gradually increases toward a rear end thereof.

5. A ball end mill according to claim 1, wherein a linear cutting edge is formed at the rearward portion of said main cutting edge,
   a front end portion of said forward portion of the main cutting edge is formed with a convex curve portion projected toward the rotational direction of the tool body when viewed from the front, and
   a radially outer portion from said convex curve portion, which is a portion of the main cutting edge consisting of the radially outer portion of said forward portion and the radially inner portion of said linear cutting edge, is substantially an arcuate shape projected counter to the rotational direction of the cutter body when viewed from the front.

6. A ball end mill according to claim 5, wherein said second cutting edge is substantially an arcuate shape projected toward the rotational direction of the tool body when viewed from the front.

7. A ball end mill according to claim 1, wherein said axial rake angle of said second edge is set in the range of 1° to 10°.

8. A single edged ball end mill comprising:
   a tool body rotatable about an axis,
   said tool body having a tip mounting seat,
   a throw-away tip being removably mounted in said tip mounting seat,
   said throw-away tip having a front end face and a rear face parallel to each other, and having side faces peripherally lying between the front face and the rear face,
   said side faces intersecting with the front face in an acute angle, so that only said front face is employed as a cutting face having as main cutting edge disposed at radially outward edge lines thereof,
   said cutting face being inclined with respect to said axis so that the axial rake angle of said main cutting edge is set at a negative angle,
   said main cutting edge having a forward portion and a rearward portion, at least the forward portion being substantially arcuately shaped when viewed from a rotational direction of said tool body and extending so as to intersect with said axis, and
   at least one chip breaker groove extending along the main cutting edge being formed on said cutting face, the width of a land between the main cutting edge and the chip breaker groove being in the range of 0.01 through 0.05 mm, so that the actual axial rake angle defined by the wall of the chip breaker groove is substantially increased.

9. A ball end mill according to claim 8, wherein the width of said at least one chip breaker groove gradually increase toward a rear end thereof.

10. A ball end mill according to claims 8 and 6, wherein the depth of said at least one chip breaker groove gradually increase toward a rear end thereof.

11. A ball end mill according to claim 8, wherein a linear cutting edge is formed at the rearward portion of said main cutting edge,
    a front end portion of said forward portion of the main cutting edge is formed with a convex curve portion projected toward the rotational direction of the tool body when viewed from the front, and a radially outer portion from said convex curve portion, which is a portion of the main cutting edge consisting of the radially outer portion of said forward portion and the radially inner portion of said linear cutting edge, is substantially an arcuate shape projected counter to the rotational direction of the cutter body when viewed from the front.

12. A ball end mill according to one of claims 1 or 8, wherein said axial rake angle of said main cutting edge is set in the range of $-5°$ to $-1°$.

13. A ball end mill according to claim 8, wherein said actual axial rake angle of at least a front portion of the main cutting edge, which is defined by the wall of the chip breaker groove, is larger than 0.

* * * * *